United States Patent
Scott et al.

(10) Patent No.: US 10,475,095 B2
(45) Date of Patent: *Nov. 12, 2019

(54) METHOD AND APPARATUS FOR EFFICIENTLY RESPONDING TO ELECTRONIC REQUESTS FOR QUOTE

(71) Applicant: Versata Development Group, Inc., Austin, TX (US)

(72) Inventors: Cheryl W. Scott, Austin, TX (US); Gunter Leeb, Austin, TX (US); David J. Reese, Austin, TX (US)

(73) Assignee: VERSATA DEVELOPMENT GROUP, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,383

(22) Filed: Oct. 28, 2013

(65) Prior Publication Data

US 2014/0052561 A1    Feb. 20, 2014

Related U.S. Application Data

(63) Continuation of application No. 13/046,537, filed on Mar. 11, 2011, now Pat. No. 8,571,940, which is a
(Continued)

(51) Int. Cl.
*G06Q 40/00* (2012.01)
*G06Q 30/06* (2012.01)
(Continued)

(52) U.S. Cl.
CPC ..... *G06Q 30/0611* (2013.01); *G06Q 10/0875* (2013.01); *G06Q 30/02* (2013.01); *G06Q 40/04* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 4,870,571 A    9/1989    Frink
5,369,732 A    11/1994   Lynch et al.
(Continued)

FOREIGN PATENT DOCUMENTS

CA    2153530 A1    1/1997
EP    1001355 A2    5/2000
(Continued)

OTHER PUBLICATIONS

TSA Gateway Purchasing Manual, Dec. 1993, pp. 1-322, Technical Services Associates, Inc., Mechanicsburg, PA.
(Continued)

*Primary Examiner* — Frantzy Poinvil
(74) *Attorney, Agent, or Firm* — Terrile, Cannatti & Chambers; Kent B. Chambers (57) ABSTRACT

A system and method for efficiently responding to electronic requests for quote ("RFQ"). Through use, a user, such as a merchant, can automatically create and deliver an electronic RFQ response, without need for any interaction by the merchant. The merchant may establish certain criteria in order to allow the system and method to automatically respond to electronic RFQ's received by the merchant.

37 Claims, 5 Drawing Sheets

Related U.S. Application Data continuation of application No. 10/145,607, filed on May 10, 2002, now Pat. No. 7,908,200.

(51) Int. Cl.
*G06Q 10/08* (2012.01)
*G06Q 30/02* (2012.01)
*G06Q 40/04* (2012.01)

(58) Field of Classification Search
USPC ....................................................... 705/3–44
See application file for complete search history.

(56) References Cited

U.S. PATENT DOCUMENTS

| | | | |
|---|---|---|---|
| 5,398,308 A | 3/1995 | Kato et al. | |
| 5,493,490 A | 2/1996 | Johnson | |
| 5,500,802 A | 3/1996 | Morris et al. | |
| 5,715,314 A | 2/1998 | Payne | |
| 5,754,850 A | 5/1998 | Janssen | |
| 5,765,138 A | 6/1998 | Aycock | |
| 5,842,178 A * | 11/1998 | Giovannoli | 705/26.4 |
| 5,897,621 A | 4/1999 | Boesch et al. | |
| 5,905,975 A | 5/1999 | Ausubel | |
| 5,907,320 A | 5/1999 | Beesley et al. | |
| 5,909,492 A | 6/1999 | Payne | |
| 5,963,939 A | 10/1999 | McCann et al. | |
| 6,009,406 A | 12/1999 | Nick | |
| 6,041,310 A | 3/2000 | Green et al. | |
| 6,115,690 A | 9/2000 | Wong | |
| 6,311,162 B1 | 10/2001 | Reichwein et al. | |
| 6,332,040 B1 | 12/2001 | Jones | |
| 6,385,602 B1 | 5/2002 | Tso et al. | |
| 6,397,212 B1 | 5/2002 | Biffar | |
| 6,418,415 B1 | 7/2002 | Walker et al. | |
| 6,449,599 B1 | 9/2002 | Payne | |
| 6,556,976 B1 | 4/2003 | Callen | |
| 6,606,744 B1 | 8/2003 | Mikurak | |
| 6,609,108 B1 | 8/2003 | Pulliam et al. | |
| 6,654,726 B1 | 11/2003 | Hanzek | |
| 6,728,685 B1 | 4/2004 | Ahluwalia | |
| 6,778,968 B1 * | 8/2004 | Gulati | 705/36 R |
| 6,865,524 B1 | 3/2005 | Shah et al. | |
| 6,868,392 B1 | 3/2005 | Ogasawara | |
| 6,895,388 B1 | 5/2005 | Smith | |
| 6,901,430 B1 * | 5/2005 | Smith | 709/206 |
| 6,920,431 B2 * | 7/2005 | Showghi et al. | 705/15 |
| 6,928,411 B1 * | 8/2005 | Fox et al. | 705/1.1 |
| 6,957,186 B1 | 10/2005 | Guheen et al. | |
| 6,980,963 B1 * | 12/2005 | Hanzek | 705/26.62 |
| 7,003,548 B1 | 2/2006 | Barck et al. | |
| 7,069,237 B1 * | 6/2006 | Tate | 705/26.41 |
| 7,165,041 B1 * | 1/2007 | Guheen et al. | 705/26.1 |
| 7,197,479 B1 | 3/2007 | Franciscus de Heer et al. | |
| 7,222,089 B2 | 5/2007 | Harpale | |
| 7,236,983 B1 | 6/2007 | Nabors et al. | |
| 7,246,087 B1 | 7/2007 | Ruppelt et al. | |
| 7,272,639 B1 * | 9/2007 | Levergood et al. | 709/218 |
| 7,353,192 B1 * | 4/2008 | Ellis et al. | 705/26.5 |
| 7,415,435 B1 | 8/2008 | Weiss et al. | |
| 7,512,548 B1 * | 3/2009 | Bezos et al. | 705/26.1 |
| 8,126,777 B2 | 2/2012 | Postelnik et al. | |
| 2001/0011250 A1 | 8/2001 | Paltenghe et al. | |
| 2001/0032166 A1 | 10/2001 | Ruffo et al. | |
| 2001/0037281 A1 | 11/2001 | French et al. | |
| 2001/0047284 A1 | 11/2001 | Blalock | |
| 2002/0032626 A1 | 3/2002 | DeWolf et al. | |
| 2002/0082958 A1 | 6/2002 | Cooley et al. | |
| 2004/0177002 A1 | 9/2004 | Abelow | |
| 2005/0102199 A1 | 5/2005 | Lee | |

FOREIGN PATENT DOCUMENTS

| | | | |
|---|---|---|---|
| WO | 9011572 | A1 | 10/1990 |
| WO | 9612242 | A1 | 4/1996 |
| WO | 9704410 | A1 | 2/1997 |
| WO | 9713329 | A2 | 4/1997 |
| WO | 0029976 | A1 | 5/2000 |
| WO | 0065505 | A2 | 11/2000 |
| WO | 0116665 | A2 | 3/2001 |

OTHER PUBLICATIONS

TSA Gateway System Management Manual, Dec. 1993, pp. 1-262, Technical Services Associates, Inc., Mechanicsburg, PA.

TSA Gateway Inventory Processes User Manual, Dec. 1993, pp. 1-148, Technical Services Associates, Inc., Mechanicsburg, PA.

TSA Gateway DOS, 1992, pp. 1-29, Technical Services Associates, Inc., Mechanicsburg, PA.

Maddox, Kate with Blankenhorn, Dana, Web Commerce: Building a Digital Business, www.Upside.com, 1998, pp. 1-12, John Wiley & Sons, Inc., New York, NY.

J-Con Manual, Apr. 1994, pp. 1-545, Cooperative Computing, Inc., Austin, TX.

Neches, Anna-Lena, Fast-A Research Project in Electronic Commerce, EM-Electronic Markets, Oct. 1993, pp. 25-27, No. 9-10, Newsletter of the Competence Centre Electronic Markets—University of St. Gallen—Institute for Information Management.

Patent Owner Post Action Closing Prosecution Submission dated May 2, 2011 as filed in reexamination of Patent No. 7,069,235.

Press release dated Sep. 30, 1996, "No-Hassle, No-Haggle Car Buying on the Internet," extracted from Autobytel.com on Jul. 9, 2003, pp. 1-2.

Press release dated Feb. 7, 1999, "Autobytel.com, Inc. to launch online wholesale auction program", extracted from Autobytel.com on Jul. 9, 2003, pp. 1-2.

Press release dated Feb. 10, 1996, Autobytel.com teams with Microsoft carsource to offer one-stop car shopping, extracted from Autobytel.com on Jul. 9, 2003, pp. 1-2.

Ford Finds That Viewdata Gives You More, Information Management pp. 4-6, Feb. 1985, 1 page.

O Leary, Mick, Compuserve is Loaded with Online Car Info, Online, vol. 19, No. 6, pp. 70-71, Nov./Dec. 1995, pp. 1-3.

Microsoft Press Computer Dictionary, Third Edition, Microsoft Press, Redmon, 1997, pp. 194 and 459.

Calico Guides Online Car Buyers Direct to European Dealers, M2 Presswire, Nov. 5, 1999, pp. 1-2.

Concentra Releases Software for Automating Sales Product Configuration, Aviation Daily, vol. 321, No. 11, Jul. 19, 1995, p. 92.

Neuborne, E. et al., Branding on the Net: The Old Rules Don't Apply. So How Do You Hustle Those Wares Online?, Business Week, No. 3603, p. 76, Nov. 9, 1998, pp. 1-7.

Autobytel.com screen shots from www.archive.org archived on Oct. 19, 1996.

Little, Meredith, Buying and Selling a Car Online, MacAuthority, Sep. 1999, pp. 1-14.

eSurvey:Auto Sales Online, Internet & Electronic Commerce Strategies, May 1999, pp. 1-3, vol. 3, Iss. 5, Carlsbad.

Business Editors and High Tech Writers 1999 Piper Jaffray Conference, Autoweb.com Corporate Profile, Business Wire, Jun. 11, 1999, pp. 1-3, New York.

Autoconnect.com, http://web.archive.org/web/19981212012714/ http://autoconnect.com, dated Dec. 12, 1998. 1 page.

"e-Quisitions Inc. Announces Inaugural Install of Its Flagship Product e-Quinox". Canada Newswire. Ottawa. Feb. 4, 2002, pp. 1-2.

Litigation Search Report dated Jul. 18, 2017, in Reissue U.S. Appl. No. 15/484,498, pp. 1-9.

Preliminary Amendment as filed in Reissue U.S. Appl. No. 15/484,498 dated Apr. 11, 2017, pp. 1-7.

(56) References Cited

OTHER PUBLICATIONS

Non-Final Office Action dated Dec. 6, 2017, in Reissue U.S. Appl. No. 15/484,498, pp. 1-28.
Response to Non-Final Office Action dated Dec. 6, 2017, as filed in Reissue U.S. Appl. No. 15/484,498 dated Jun. 6, 2018, pp. 1-28.
Office Action under Ex Parte Quayle dated Mar. 29, 2019, mailed in Reissue U.S. Appl. No. 15/484,498, pp. 1-9.

* cited by examiner

METHOD AND APPARATUS FOR EFFICIENTLY RESPONDING TO ELECTRONIC REQUESTS FOR QUOTE

CROSS-REFERENCE TO RELATED APPLICATIONS

This application is a continuation of co-pending application Ser. No. 13/046,537, filed Mar. 11, 2011, now U.S. Pat. No. 8,571,940, entitled "Method and apparatus for efficiently responding to electronic requests for quote", which is a continuation of application Ser. No. 10/145,607, filed May 10, 2002, now U.S. Pat. No. 7,908,200, entitled "Method and apparatus for efficiently generating electronic requests for quote", which relates to application Ser. No. 09/571,792, filed on May 10, 2002, now abandoned, entitled "Method and Apparatus for Processing Requests for Quotations", and commonly assigned with application Ser. No. 10/145,607, filed May 14, 2002, now U.S. Pat. No. 7,908,200, entitled "Method and Apparatus for efficiently generating electronic requests for quote". All of these applications are incorporated herein by reference in their entirety.

BACKGROUND OF THE INVENTION

1. Field of the Invention

The present invention relates to methods and apparatus for efficiently generating and responding to electronic requests for quote.

2. Description of the Related Art

Choosing and purchasing products today is a time consuming and difficult task for buyers, especially corporate buyers who are responsible for purchasing large amounts of information technology (IT) equipment (e.g., desktop computers, laptop computers, servers, software, etc.). Buyers of IT equipment must spend a large amount of time accessing a variety of different sources through a variety of means to research the equipment they need and the merchant from which they want to buy. To obtain the desired products at the least cost with the right service options, the corporate buyer typically requests quotes from various merchants, and subsequently selects the most competitive of the quotes. To this end, the buyer prepares a general list of products wanted along with other information (e.g., delivery date), and sends the list to a number of merchants via either fax, e-mail, or regular mail. The merchants, in response, generate quotes which are returned to the buyer via e-mail, fax, or regular mail.

As discussed, the generating of requests for quotes and responses thereto is a very time consuming practice. This is even the case if the requests and/or responses are prepared electronically, as a user must manually obtain and enter the desired information.

SUMMARY OF THE INVENTION

The present invention relates to a system, a method, or carrier medium comprising instructions executable by a computer system for efficiently generating and responding to electronic requests for quote ("RFQ"). As used herein, the term "RFQ" is understood to include, but not be limited to, request for quote, request for bid, request for services, request for data/information, request for proposal, and the like, and is not to be limited to the more limiting, general commercial use of "RFQ," i.e., a request for quote.

The term "system" as used herein generally describes hardware components that in combination allow the execution of software programs or algorithms. Hardware generally includes a processor, memory medium, and input/output (I/O) devices. As used herein the term "processor" generally describes the logic circuitry that responds to and processes basic instructions contained in a memory medium. The term "memory medium" includes an installation medium, e.g., a CD ROM, or floppy disks; a volatile computer system memory such as DRAM, SRAM, rambus RAM, etc.; or a non volatile memory such as optical storage or magnetic medium, e.g., a hard drive. The term "memory" is used interchangeably with "memory medium" herein. The memory medium may comprise other types of memory or combinations thereof. In addition, the memory medium may be located in a system in which the software programs are executed, or may be located in a second system that connects to the first system over a network. In this later instance, the second system provides the program instructions to the first computer for execution.

Systems may take various forms. In general, systems can be broadly defined to encompass any device having a processor that executes instructions from a memory medium. Instructions for implementing the present invention on a system can be received by the system via a carrier medium. The carrier medium may include the memory media or storage media described above in addition to signals such as electrical or electromagnetic signals, conveyed via a communication medium such as a network and/or wireless link.

Figure 1:
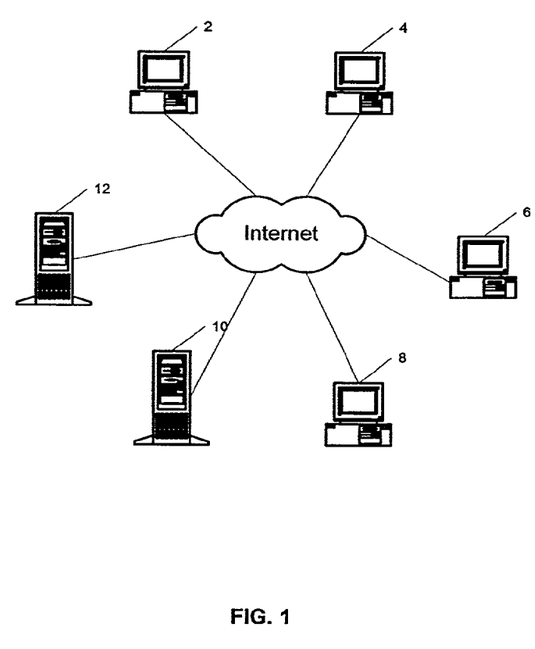
FIG. 1 shows a block diagram of a network of interconnected computers.

FIG. 1 shows a network of computer systems. More particularly, FIG. 1 shows a network having several client computer systems or terminals 2 through 8 coupled to server computer systems 10 and 12 via the Internet. One or more of the servers 10 and 12 and terminals 2 through 8 may include a database. It is to be understood that in example embodiments more or fewer client and server systems may be present.

The present invention in one embodiment permits a user, who may be a buyer (including an individual) involved in any part of a channel of distribution of particular goods and/or services, to automatically create and deliver an electronic RFQ to one or more preselected merchants. By use of the system, a user can often save significant time, expense, and resources typically incurred in creating and delivering an RFQ. In an example embodiment, in an instant RFQ system, the RFQ is automatically generated based on the product(s) and quantities selected by the user, preselected user preferences, and/or system preferences and business rules.

As used herein, the terms "automatically" and "instant" both mean that a requested activity (i.e., the generation of an RFQ or a response thereto) is performed by a computing means with minimal or no involvement by a user. It is to be understood that such instant or automatic RFQ generation is distinguished from manual creation of an RFQ electronically, such as described in co-pending application Ser. No. 09/571,192 referenced above. In such a manual process, a user creates an RFQ via a user interface or the like by manually entering data or selecting from menus (e.g., pull-down lists or the like) into an electronic RFQ form.

The instant RFQ may be generated from any website or location from which a user desires to access the instant RFQ function. For example, a user may be viewing a website of an etailer (i.e., a retailer of products sold or licensed via the world wide web or its successors ("Web")) relating to a particular computer or other product. As used herein, the term "product" is defined broadly to encompass goods, services, information, and other things that may be sold, licensed or otherwise provided or transferred. Using the methods disclosed herein, the user can simply click on an "Instant RFQ" or similar function button available on the website or perform other user activated operations to select a product, and the system will automatically configure and deliver an RFQ to merchants for the selected product in accordance with the user preferences.

Further, in example embodiments, a response to an RFQ (otherwise known as a "quote") may be prepared and delivered automatically, without need for any interaction by a merchant. In other embodiments, a response may be prepared and delivered efficiently by a system in which certain portions of the response may be instantly prepared by autopopulation or the like. By use of the system and methods disclosed herein, a seller, who may be a merchant of goods and/or services and/or information in any part of a channel of distribution for such goods/services/information, may efficiently respond to an electronic RFQ.

In an example embodiment, the methods disclosed herein may be used in connection with a global computer network, such as the Internet or other such network, in which a plurality of buyers and sellers interact. In an example embodiment, the buyers and sellers may be interconnected to a central system, such as a server computer (e.g., through an application service provider ("ASP") or the like) as shown in the example network of FIG. 1. The central system may be used as a central clearinghouse/manager with regard to the processing of RFQs and responses thereto.

A more detailed discussion of an example architecture of such a system is disclosed in the application referred to above, entitled "Method and Apparatus for Processing Requests for Quotations" filed on the same date as the present application.

In use of such a system, a buyer may send an RFQ, which may be generated using the methods disclosed herein, electronically to a group of sellers. Upon receipt of the electronic RFQ, a merchant may then use the methods disclosed herein to respond to the RFQ efficiently.

In an example embodiment, a user may first configure a profile to reflect that user's preferences or accept a default profile with regard to efficiently creating RFQs. Such a configuration process may include responding to a series of fields within a user interface or the like. In an example embodiment, this user profile may be stored at a central location or alternately, it may be stored at the user location or any other place accessible to the RFQ system.

When the user finds a product or products for which he seeks to develop an RFQ, the user may select the automatic RFQ function. In an example embodiment, the user may locate the product(s) via a website (such as an electronic marketplace or manufacturer's or etailer's site) using a web browser or the like, or may locate the product in an electronic database to which he has access through an online service or application software on his computer. In certain embodiments, the user may access the website of an application service provider (ASP), which provides access to one or more product databases from which to select products. Further, such a website may have a list, such as a pull-down menu showing the various products potentially available.

The user may select the automatic RFQ function in a number of ways, such as by selecting an "Instant RFQ" button or the like available in conjunction with a list of products in an electronic marketplace, on the manufacturer's or retailer's website, or the user may alternately access the ASP's website, which performs the instant RFQ function. Upon selection, the system will access the buyer profile, and an RFQ will be efficiently configured using the information stored therein. Alternately, the profile may be supplied to the system (together with the product selection) from the user's computer or the system may request the information from a remote database or another system to collect the user's profile. In certain embodiments, a buyer may choose to have only part of the RFQ prepared automatically, and the buyer will actively create or edit part of the RFQ before delivery. In other embodiments, a buyer may choose an option between these two extremes, such as selecting to approve an automatically prepared RFQ before it is delivered. In an example embodiment, a buyer may view the RFQ before it is delivered.

A similar process may be performed on the seller's side of the instant RFQ system. In an example embodiment, a merchant operating a workstation may first configure a profile to reflect that merchant's preferences with regard to efficiently responding to RFQs. Such a configuration process may include responding to a series of fields within a user interface or the like. Upon completion, this merchant profile may be stored at a central location (e.g., a server computer) or it may be stored at the merchant workstation (or both).

When RFQs are then directed to the merchant (which may be via a central server, as discussed above, or via an email to the merchant's workstation), the merchant profile will be accessed, and a response will be efficiently configured using the information stored therein. In certain embodiments, a merchant may choose (based on its profile) to have the entire response process performed automatically, that is, the response may be generated and delivered electronically, without the merchant even being aware of the presence of the RFQ. Alternately, a merchant may choose to have only part of the response prepared automatically, and the merchant will actively create or edit part of the response before delivery. In other embodiments, a merchant may choose an option between these two extremes, such as selecting to approve an automatically prepared response before it is delivered.

Thus, using the methods and system disclosed herein, a buyer and seller may efficiently generate and respond to an electronic RFQ via a network of interconnected computers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Referring again to FIG. 1, a large area network, such as the Internet, includes a plurality of networked "servers" 10 and 12 that are accessible by "client terminals" 2 through 8. Communication between the servers 10 and 12 and the client terminals 2-8 typically occurs over a publicly accessible network, such as a public switched telephone network over asynchronous digital subscriber lines ("ASDL") telephone lines, or large bandwidth trunks, such as T1 or OC3 service. The client terminals 2-8 access the various servers 10 and 12 through an Internet service provider, e.g., America On-Line, Prodigy, CompuServe and the like, by executing application specific software, commonly referred to as a "browser", on a workstation, such as computer 14, shown more clearly in FIG. 2.

Figure 2:
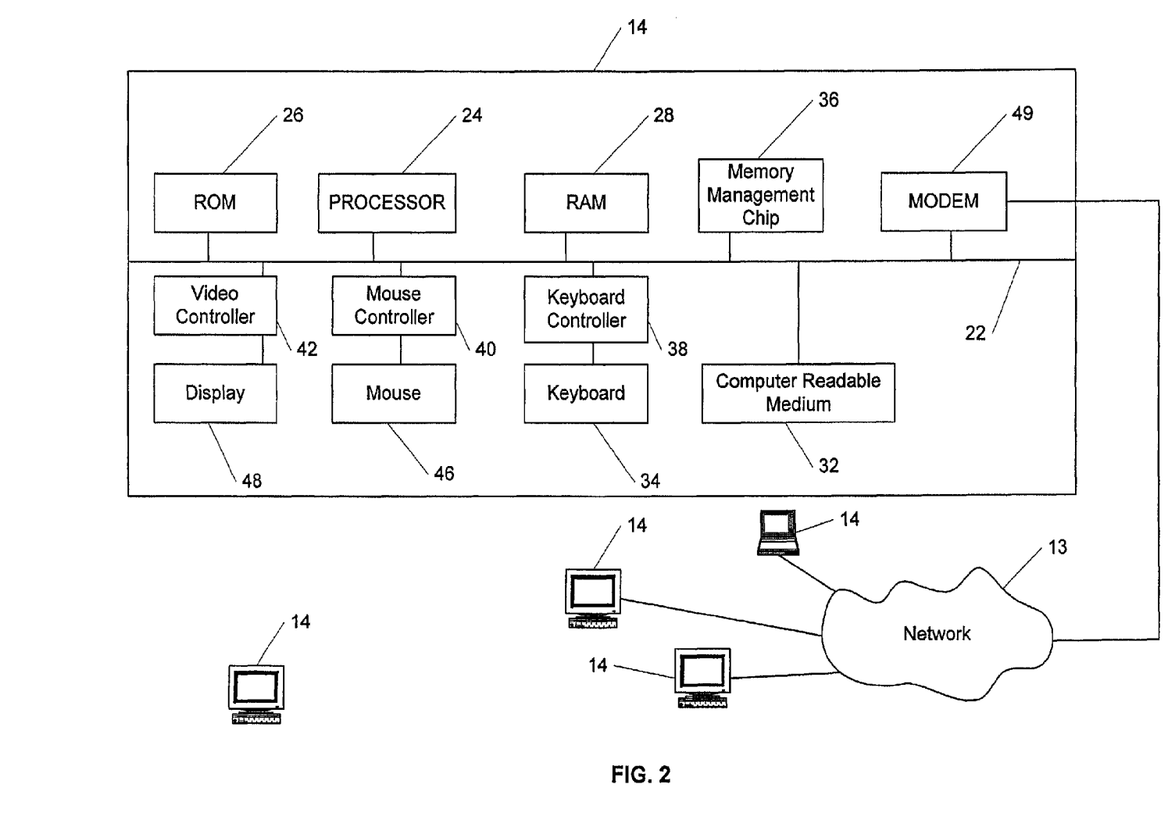
FIG. 2 is a block diagram of a computer system.

Referring to FIG. 2, an exemplary computer system 14 that may be associated with the servers 10 and 12 and client terminals 2-8 has one or more system buses 22 placing various components of the system in data communication. The system bus 22 allows data communication between processor 24 and both a read only memory (ROM) 26 and random access memory (RAM) 28. The ROM 26 contains among other code, the Basic Input-Output system (BIOS) which controls basic hardware operation, such as the interaction with peripheral components such as keyboard 34. Applications resident with a computer system 14 are generally stored on and accessed via a computer readable medium 32, such as a hard disk drive, optical drive, floppy disk drive, compact disk, or other storage medium. Additionally, applications may be in the form of electronic signals modulated in accordance with the application and data communication technology when accessed via a network.

The RAM 28 is the main memory into which the operating system and application programs are loaded and generally affords at least 32 megabytes of memory space. Through data communication on system bus 22, memory management chip 36 controls direct memory access (DMA) operations. DMA operations include passing data between the RAM 28 and the mass storage memory 32. Also in data communication with the system bus 22 are various I/O controllers: a keyboard controller 38, a mouse controller 40 and a video controller 42. The keyboard controller 38 provides a hardware interface for the keyboard 34, the mouse controller 40 provides the hardware interface for a mouse 46, or other point and click device, and the video controller 42 provides a hardware interface for a display 48.

A modem 49 or network circuitry (not shown) enables networked computer systems 14 to communicate data over a network via any of various data communication technologies such as digital subscriber lines ("DSL"), ADSL, ISDN, or ordinary telephone lines. The operating system of the computer system 14 may be WINDOWS 98, UNIX, or any other known operating system. The RAM 28 also supports a number of Internet access tools, including, for example, an HTTP-compliant Web browser having a JavaScript interpreter, such as Netscape Navigator, Microsoft Internet Explorer, and other similar browsers.

The architecture discussed in FIGS. 1 and 2, and discussed more fully in the co-pending application entitled "Method and Apparatus for Processing Requests for Quotations," referenced above, may be used to create and respond efficiently to RFQs using the methods disclosed herein.

Figure 3:
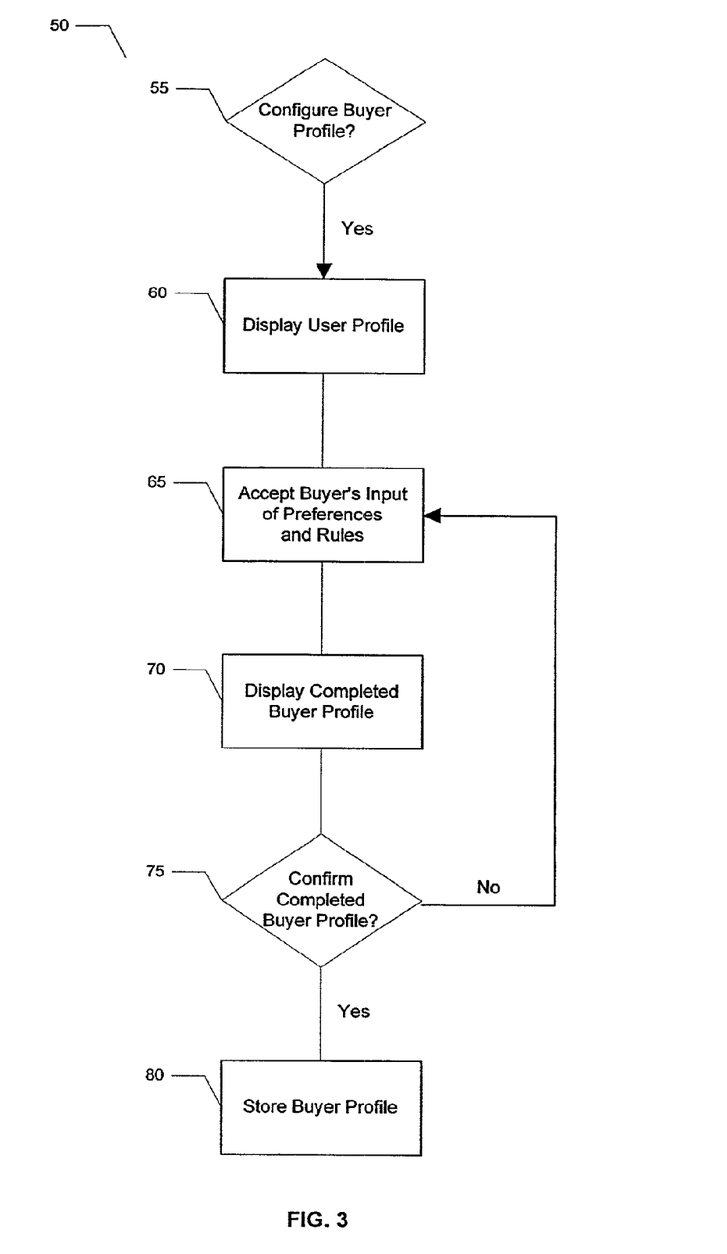
FIG. 3 is a flow chart of an example configuration method to configure a buyer profile.

To efficiently create RFQs, a buyer may first create a buyer profile, indicating preferences that govern creation of RFQs. FIG. 3 is a flow chart of an example embodiment of a process for generating a buyer profile. As shown in FIG. 3, a buyer may choose to configure a profile at step 55. In an example embodiment, this buyer profile may be created by a user's responses to inquiries displayed via a user interface, which may be accessible via a website, user-loaded software, or other such electronic means, or the profile may be created manually by filling out a questionnaire or sending an email or via telephone to a call-center or the like, to enter the information into the system. Thus, in step 60, the user interface is displayed to the user.

In an example embodiment, the user interface may contain a plurality of fields for selection of various preferences. The fields may be set up for open-ended responses (such as name and address fields) or may seek closed responses, such as through the use of click-down menus or other selection of preexisting responses. In various embodiments, the number and type of such fields may vary considerably. The user provides responses to the various preferences and rules, which are accepted by the system at step 65.

An example embodiment may include the following fields, which are discussed in detail. A first group of fields may relate to identification fields for the buyer. Included in such identification fields may be information relating to the buyer (organization), such as company size, growth/revenue, business type, buying history, tax status (e.g., non-profit) and the like. Of course, it is to be understood that individual buyers may also generate buyer profiles configured for their purposes.

A second group of fields may relate to user preferences in creating the instant RFQ. These preference fields may relate to various items typically present in an RFQ, such as a merchant list, days until the due date, default service requirements, days prior to sending the RFQ, days until delivery after an order, and the like. In example embodiments, the choice of which merchants to send the RFQ to may be based on various criteria. For example, a buyer may want to send the RFQ to all merchants in the system, or the buyer may manually create a preferred merchant list. Alternately, an automatically generated preferred merchant list (e.g., ranking by the system) may be adopted. Other criteria in selecting merchants may include, for example, distance between buyer and seller, buying history of buyer, a seller's product spectrum, seller qualifications and service offerings (e.g., authorizations), product category and seller's specialization, and product availability. Thus, the user may select one or more of these or like criteria in determining what merchants will be selected for receiving an RFQ.

Additional fields relating to a buyer's preferences may include a due date for bids, which in an example embodiment may be a pre-selected number of days into the future. Further, a user's service requirements, such as the level of technical support needed for computer equipment (i.e., on-site support, call center, 24/7, etc.) may be selected. Further fields may include notification messages (user defaults), and additional user information and comments (to be included in a notification message, which will be discussed below).

After completing the buyer profile, the system may display the completed profile to the user at step 70. Then at step 75, the user may confirm that all information is correct. Then, at step 80, the profile is stored so that it may be accessed for use in creation of an instant RFQ. In example embodiments, the profile may be stored in a central location, such as a central server, so that it may be accessed in operation of the system. Alternately (or in parallel), the profile may be stored in the remote user's workstation, for access in embodiments in which the instant RFQ process is run from an application loaded on the user's workstation. Furthermore, the remotely stored profile may be accessed via the Internet or other global computer network as a type of "cookie" file indicative of the user's preferences or in other such manner.

It is to be understood that wherever the buyer profile is stored, it may be accessed by the buyer at any time in order to edit or modify any of the fields (or add additional fields), based upon the buyer's then-current preferences.

Figure 4:
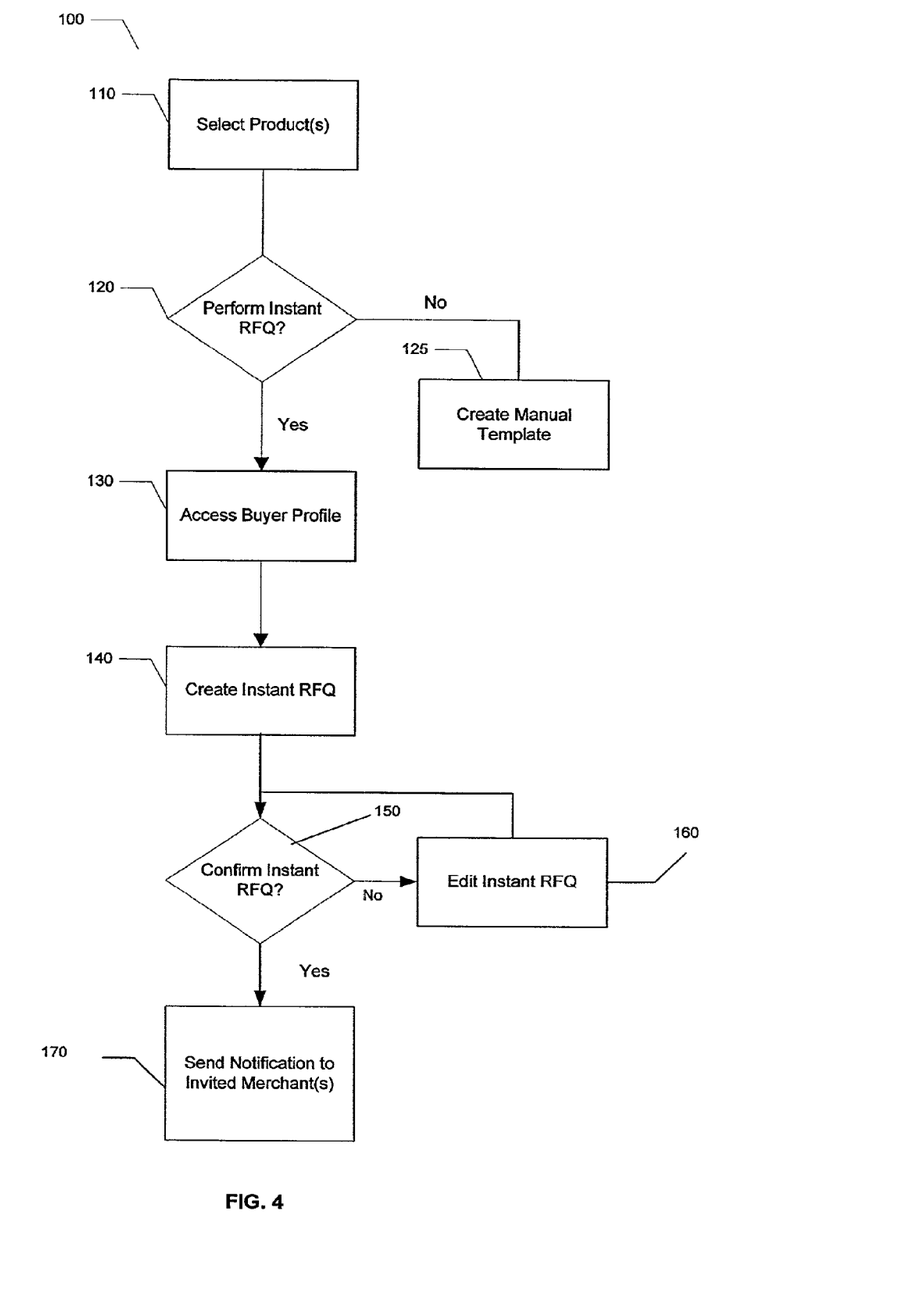
FIG. 4 is a flow chart of an example automatic RFQ process.

In operation of an example embodiment of an instant RFQ process 100, the user starts the instant RFQ process by selecting one or more products and choosing to create an instant RFQ, as shown in FIG. 4 at steps 110 and 120. The user may access the products via various sources, as discussed above, such as a website, database, or other collection of products. (It is to be understood that if an automatic RFQ is not selected, a manual template may be provided for the user at step 125.) As discussed above, there may be a button, clickable icon or the like for the user to instruct the system to create the RFQ. Also, a user may select the automatic option from a menu or by command line. For example, an "instant RFQ" button may be next to a product line item from catalog search results or on a shopping cart type screen. Upon the command to create an instant RFQ, the buyer's profile will be accessed at step 130. Then, based on the product(s), buyer profile, and system rules (and merchant rules, as needed), the RFQ is automatically created at step 140. In an example embodiment, the generation may occur at a central server location, such as an ASP's server. However, it is to be understood that in other embodiments the operation may occur elsewhere.

In an example embodiment, the instant RFQ will be displayed on the user's workstation in a user interface, in which the selected product(s), applicable preferences and a changeable quantity field are displayed back to the user for confirmation. Also, the instant RFQ contains an RFQ identification, which may be a simple number or a more descriptive term generated from the products requested in the RFQ, send date and the like. An embodiment may also display details of when and where results can be compared.

It is to be understood that described herein are example process steps rather than alternatives. Business rules and system design may leave out certain steps and in some cases change the order.

In operation, the merchant lists to whom the instant RFQ will be delivered is configured by the system based on the preferences set in the buyer's profile. In addition, system preference rules, business rules, and merchant preferences will be analyzed by the system in creating a merchant list. These rules may include:

1. selecting all merchants known to the RFQ system;
2. removing sellers that will not deliver to the buyer (e.g., different sales area, out of distance, wrong organization type, etc.);
3. removing sellers that are out of distance to the buyer (based upon the preselected user preference);
4. merging the user's list of unconditional preferred merchants;
5. removing sellers not selling products from the requested category;
6. removing sellers that will not do business with the buyer based on the user's profile;
7. removing sellers that do not meet the requested qualifications (e.g., merchants not having 24 hour tech support); and/or
8. removing sellers that do not have the product available.

Further, the system may sort the remaining merchants in the list based on seller ranking (user preference specifies sort criteria, e.g., most bids awarded, most responses, highest volume, industry awards, seller size, and the like). Additionally, the system may prepend the user's list of unconditional preferred merchants (if present in the buyer's profile). Finally, in example embodiments, the system may have a preselected maximum number of merchants to whom an RFQ will be delivered and if so, the system will trim the merchant list to the system set maximum.

Further, the system inserts other fields from the user profile and system preferences, such as due date (which may be generated from the days until due date value in the buyer's profile), service requirements, send date and additional information. Upon completion of the instant RFQ, the system will seek confirmation from the buyer that all of the information is correct at step 150. The buyer may confirm the RFQ by a single click (i.e., selecting a "Confirm" or "Send" button on the RFQ). If the buyer does not confirm the RFQ, he may edit it at step 160.

The system then sends notifications to the invited merchants regarding the RFQ at step 170. This notification may take different forms in various embodiments. In one example embodiment, the notification may include the RFQ itself, and may be sent via e-mail directly to a representative of the merchant, sales people of the merchant organization, or subset or the like. Alternately, the notification may be an e-mail containing a clickable uniform resource locator (generally known as "URL"), providing the merchant with a way to access the RFQ at a specified location (which in an example embodiment may be a central location of an ASP) via the Internet or other computer network where buyers and sellers are connected. Other means of notification may include notifications on the site, pop-up messages in user-loaded software, fax, pager, voice mail, call, and the like. The system rules or the seller's preferences may also state that the user does not receive notifications.

In certain embodiments, a merchant who receives an electronic RFQ (generated automatically or manually) may choose to respond automatically (without even being aware of the presence of the RFQ) in a manner similar to that discussed above in connection with generating an RFQ.

To be able to efficiently bid or respond to RFQs, a merchant may first create a merchant profile in a similar manner as discussed above in connection with FIG. 3, indicating preferences to be following in efficiently responding. In an example embodiment, this merchant profile may be created by a user interface, which may be accessible via a website, user-loaded software, or other such electronic means. Alternately, the profile may be created manually, by filling out a questionnaire or the like, or via contacting a call center (via telephone, email, fax, mail, etc) which enters the information and/or makes it accessible to the system. If obtained via a website, the user interface may be in HTML format or other such markup language.

In an example embodiment, the user interface may contain a plurality of fields for selection of various preferences. The fields may be set up for open-ended responses (such as name and address fields) or may seek closed responses, such as through the use of click-down menus or other selection of preexisting responses. In various embodiments, the number and type of such fields may vary considerably.

An example embodiment may include the following fields, which are discussed in detail. A first group of fields may relate to identification fields seeking name and address information. Additionally, fields may be present to describe in detail that merchant's business operation, such as level in a distribution channel (i.e., manufacturer, distributor, value-added reseller, and the like), and a merchant's authorization status (such as whether the merchant is authorized to sell and/or service a particular brand of computer equipment).

Another group of fields may include rules-based analysis of situations in which and how a merchant desires to implement an automatic or other efficient response. More specifically, in an example embodiment, such rules may include:

1. rules for rejecting an RFQ (and approving the rejection);
2. rules when an automatic reply should be used;
3. rules when a user needs to approve a reply;
4. rules for creating the reply (i.e. filling in the values (e.g. price)); and
5. rules for rejecting a reply after the reply has been generated.

Further, these rules may include a determination of whether and at what preselected threshold a merchant desires to deliver automatic responses (that is, a response will be prepared without any interaction by the merchant). For example, a merchant may provide a preselected transaction amount below which the merchant desires a response to be prepared automatically. Further, there may exist a lower threshold below which a merchant chooses to reject an RFQ or not to respond whatsoever.

Alternately, the merchant may select a transaction amount above which it may choose to review and approve automatically generated responses. In yet other embodiments, the merchant may choose to have a partially automated response process in which certain information is automatically generated, and other information is entered by the merchant. Other rules fields may include how to analyze a buyer business profile, quantity of goods/services requested, and the like.

Another group of fields may relate to selection of preferences in automatically responding. These fields may include rules to determine where the merchant will obtain the product in question. For example, a merchant may obtain its goods from a variety of different suppliers or distributors, depending on variables relating to pricing, availability, delivery, location, and the like. In this supplier field, the merchant may select one or more suppliers from which it will obtain the products that are the subject of the RFQ. For example, a merchant typically has prearranged business relationships with one or more distributors. It is to be understood that in operation, the system may then use this supplier field to automatically seek and obtain price and availability information regarding the product from the one or more suppliers selected by the merchant. In example embodiments, the system may obtain this information from a central database, or alternately, the system may obtain real-time information from the supplier or suppliers via the Internet or other computer network.

Yet another preference field may be rules relating to how to choose between more than one supplier, assuming that the multiple suppliers have the same product. Preferences relating to the choice of supplier may include lowest price, availability, history, location, and the like. Further, a preference field may exist to select a preferred distributor based on history, price, or availability, meaning that the system will obtain price and availability information from only that distributor. In an embodiment in which ease of processing is desired, a single preferred distributor will typically be selected by the merchant. In certain embodiments, the seller may choose to inform the distributor regarding the buyer's interest in the particular product(s) and quantity. Further, in an example embodiment, the merchant may select a distributor from a preferred distributor list, in which the system will select a preferred distributor, so long as the cost is not more than a preselected percentage above the lowest cost distributor (or select the cheapest distributor from the list of preferred distributors).

Another preference field may be the expected delivery date, which may be selected to be a preselected time after acceptance of the response, on an "in stock" basis, or other such basis. Another preference field may be whether the merchant chooses to substitute another product for the requested product, which may be performed on a comparison with the RFQ product based on attributes of the products, their cost, ranking and availability of the products (i.e., from the respective products' datasheets). However, in example embodiments, the system or buyer may override any such substitution by stating that no substitutions are permitted.

A further preference field may relate to a determination of pricing in responding to the RFQ. For example, the selections for pricing preference may be a merchant's list price or a preselected mark-up or margin over the cost basis obtained from the supplier, and whether the margin varies from supplier to supplier or buyer. Additionally, the margin may vary depending on product/category. In example embodiments, the mark-up may be a fixed markup, or may be a percentage with or without a minimum mark-up, and may include discounts or increases based on buyer and/or quantities, special agreement with the buyer, and/or total price. It is to be understood that for certain quotes, a merchant may select a margin that is zero or even negative.

Additional fields may relate to other information to be provided in a quote, such as the date until when the quoted price is valid, additional shipping/handling charges, taxes, shipping alternatives, and the like. It is to be understood that in certain embodiments, more or fewer fields may be present for creating a merchant profile. For example, automatic product substitutions, quantity adjustments, and the ability to up-sell/cross-sell other products may be available to be selected by a merchant.

As discussed above, upon completion of the profile, it may be stored in one or more locations for access in efficiently responding to RFQs. These locations may include a merchant database of a central server, a merchant workstation, and the like. At a later time, the merchant may access the profile to modify any of the fields, add additional information, and the like.

In operation of the efficient response process, the RFQ system receives an electronic RFQ via the network directed to the merchant by the buyer. The buyer may select the merchant as a result of choosing the specific merchant, or by selecting the merchant as part of a group of merchants. For purposes of this discussion, it will be assumed that the RFQ goes to a central server for processing and delivery. However, it is to be understood that the merchant or another third party may perform the efficient response process at a location other than a central server.

As discussed, the RFQ may have a plurality of fields, including a product identification code, which may be a SKU number, name, or other such identifier. Other information is typically included in an RFQ, such as quantity, delivery requirements, comment field, and the like.

Figure 5:
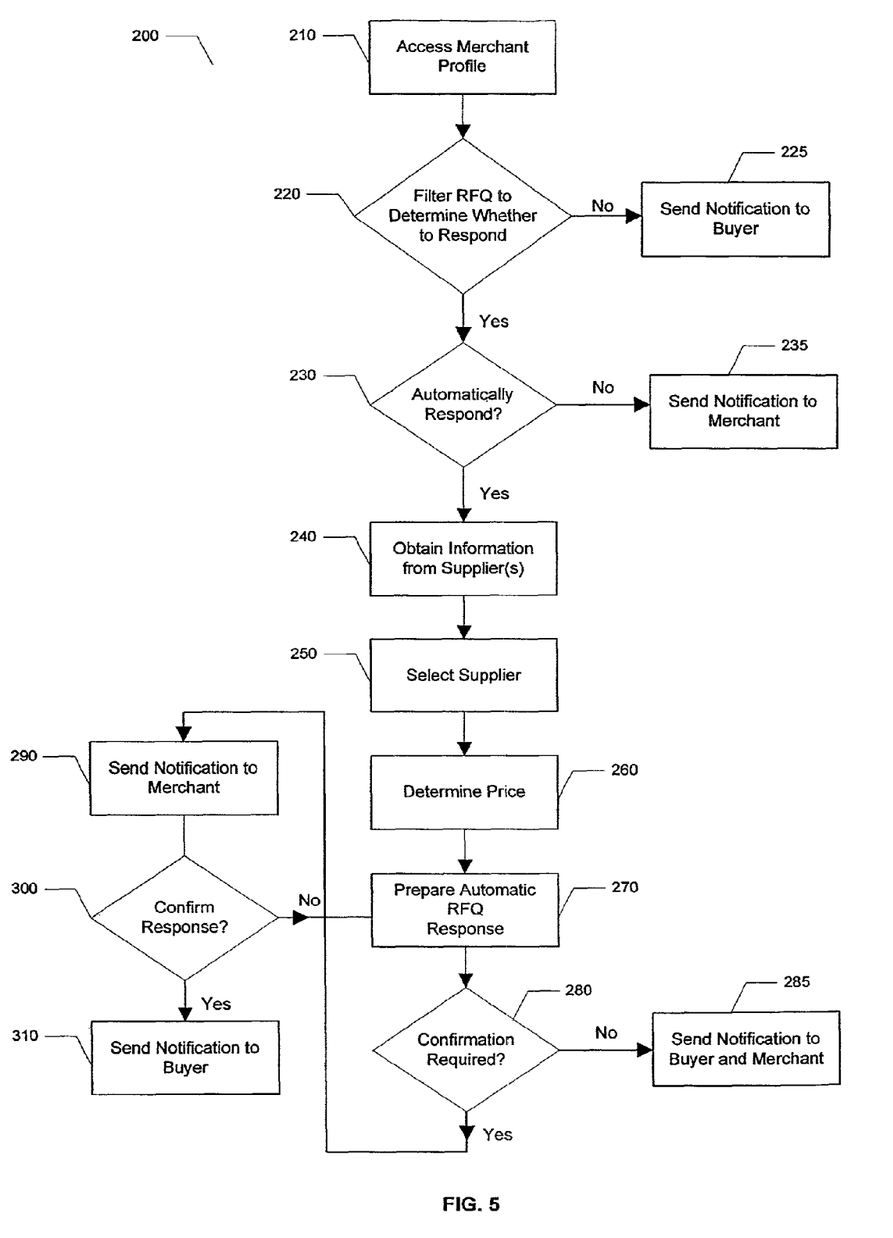
FIG. 5 is a flow chart of an example automatic RFQ response process.

FIG. 5 is a flow chart of an example automatic quote response process. As shown in FIG. 5, upon receipt of the RFQ, the server will access the merchant profile corresponding to the requested merchant from the merchant database or other such location at step 210. Next, the server analyzes the various fields within the RFQ to the rules and preferences of the merchant and its profile. If not done when creating the RFQ, upon receipt of an RFQ, it is first checked to automatically determine whether a bid will even be generated for the RFQ based on the merchant profile. This determination is the reverse of the merchant selection steps described above, but is controlled by the seller instead of the buyer. On the buyer's side, this determination is a filtering process in which the RFQ is first implicitly filtered based upon information contained in the merchant profile. Such information may include that the merchant does not sell the requested products, or the merchant does not want to do business with the particular buyer (or class of buyers). This type of filtering may be called implicit filtering because it is performed on the buyer side of the process, and accordingly, is unnoticeable to the seller.

Additionally, explicit filtering is performed on an RFQ, in which the RFQ is automatically rejected based on a seller's preferences. Examples of reasons why a seller may choose to reject an RFQ include: a minimum quantity is not met; an expected total revenue is below a predetermined limit; the seller does not have the product(s) in stock; the seller cannot get the product from its preselected distributors; or cannot receive the products from distributors in time (e.g., because they are backordered with the distributors). Other reasons for rejecting an RFQ may include that the buyer is not in the seller's predefined delivery area, or does not have the services requested, or is part of a special list of buyers to reject. Collectively, the implicit and explicit filtering are shown at step 220 of FIG. 5. If no bid will be forthcoming from the seller, a notification will be sent to the buyer at step 225. If the system decides to reject an RFQ in this manner, the user may have the option to require a confirmation.

Typically the server will then determine whether the RFQ may be automatically responded to at step 230. For example, a merchant may desire to not automatically respond to RFQs over a certain dollar amount, as there may be more issues relating to them, such as whether the merchant desires that amount of business and the like. If the rules indicate that the particular RFQ may not be automatically responded to, based upon seller preferences, the server will notify the merchant that an RFQ is present for responding at step 235. If some amount of automatic response is permitted by the merchant preferences, the server will configure the response to the extent permitted by the merchant, then the server will notify the merchant and provide the partially completed response to the merchant for approval and/or further processing.

If automatic processing is indicated, the server may next determine a product corresponding to the product identifier (i.e., SKU number or the like). Then, the server will access one or more databases (in accordance with the merchant's preferences) to obtain information from the suppliers at step 240, such as ascertaining the merchant's cost of the product. As discussed above, these databases may include a central product database accessible by the server, and may also include communication to remote databases of one or more suppliers to the merchant in order to ascertain real-time cost and availability information. This is particularly desirable for RFQs relating to technology products, which are known for their rapidly changing (and often times falling) prices. In an example embodiment relating to such technology products, supplier databases may include those available via the Internet (but not necessarily over the www) from major distributors, such as Ingram Micro (accessible via the Internet at www.ingram.com), Tech Data (www.techdata.com), and Pinacor (www.pinacor.com).

The merchant's preferences contain all necessary details to communicate with the supplier and obtain such price and availability information. Typically, a merchant provides any login/password information necessary for the system to retrieve the information from the supplier's database on behalf of the merchant. Furthermore, the system may have a regularly maintained database that includes pricing and availability information relating to a number of products and from a number of suppliers. It is to be understood that while the process is being discussed in connection with a single product, numerous goods/services within a single RFQ may be processed in like manner, individually or in batch. Further, multiple RFQs may be processed in like manner.

In accordance with the merchant's preferences, if cost and availability information is obtained from more than one supplier, the server will apply the preferences to determine which supplier is to be used in constructing the response to the RFQ at step 250. Based on the cost information of the selected supplier, the server will calculate a bid price for the product at step 260. The bid price is calculated in accordance with the merchant's preferences for determining bid price, which as discussed above, may include a preselected margin over cost, a minimum mark-up, application of any discounts, and the like. Additionally, if multiple units of a product are requested, the extended bid price is also calculated, and may include further discounts, rebates, and the like.

Internally, the server may create a blank template to prepare the automatic response at step 270. The response fields may include merchant identification information, price, availability, delivery, and other such terms, and may also include an open field, so that a standard message from the merchant, such as relating to service or standard terms, may be provided. The server prepares the blank template with any standard, fixed information, such as identification information and standard messages. Further, the server may autopopulate fields relating to the information obtained from the RFQ itself, such as product, quantity and other such information. It is to be understood however that preparing the response form may be performed in any order.

The calculated bid price and any extensions thereof are then entered into the response form. Any other fields required to be included in the response may be filled out in a similar manner. Examples of such fields include delivery information, shipping information, taxes, and the like. Additionally, based on the preferences, the response may include fields for attempting to up-sell/cross-sell additional items to the buyer. However, in an embodiment in which ease of processing is important, such fields may not be present.

Upon finalizing the response, the server determines whether confirmation is required before delivery at step 280. If not, the server electronically delivers notification of the response to the buyer and to the merchant at step 285. As discussed above, in other embodiments, the system may be used to create responses that require approval before delivery. Often times, a merchant will require authorization before delivery of a bid having at least a certain dollar amount of goods/services. In such embodiments, upon completion of the response, the server (or application in the system) will provide notification to the merchant that a response is available for approval at step 290. Such notification may be accomplished in various ways, such as by sending an email, fax, page, telephone message or the like. Further, as with the notification to the buyer, the notification itself may include the response, or it may provide an address from which to review the response. For example, an email may be sent in which a clickable URL is present, so that the merchant may click on the link to access the response. Typically, a notification contains instructions on how the quote can be accessed by the buyer.

Based on seller preferences, criteria for determining whether approval is required may vary. In various embodiments, the seller may require confirmation for all or none of the automatically generated responses, or all responses over a predetermined amount. Also if there has been no approval after a predetermined amount of time after the merchant has been notified, the system may send the response automatically, in certain embodiments. In other embodiments, confirmation may be required for a particular buyer or specified set of buyers, while quotes for other buyers may be sent immediately. Further, if services are part of the quote, a seller may choose to require approval of the quote.

If approval is indicated, after review, the merchant may approve the response by notifying the server that the response is ready for delivery at step 300. The merchant may also print out a copy of the quote and may deliver the response itself. Alternately, if the merchant desires to make changes, it can do so by directly editing the response, and delivering the revised response back to the server. In another embodiment, the merchant may choose to change some preferences and recreate the instant quote at step 270. Upon receipt of approval, the server will deliver the response to the buyer, as discussed above, at step 310.

In yet other embodiments in which a merchant desires that only a portion of a response is automatically prepared, the server will send the automatically generated portion (which in an example embodiment, may include merchant identification information or further information, such as discussed above) to the merchant for finalization. Upon finalization, the merchant can directly deliver the response, or may provide the finalized response to the server for further processing and delivery.

It is to be understood that the invention may be embodied in data, a computer readable medium, and the like, such as an application. Further, it is to be understood that the methods disclosed herein may be performed in accordance with computer instructions corresponding to the steps described above, and such a computer program may be any machine-readable storage medium having a set of instructions for causing a computer, such as a general purpose computer, to perform the above-described steps. In particular, the medium may include, for example, magnetic storage medium, including disk and tape storage medium; optical storage medium, including compact disk memory and digital video disk storage medium; nonvolatile memory storage memory; volatile storage medium; and modulated, electronic signals.

Although the above disclosure includes a discussion of both automatic RFQ generation and automatically responding to an RFQ, it is to be understood that in certain embodiments, some or all of only one side of the process is automated. Also, one side (e.g., buyer) may be automated, while only a part of the merchant side is automated. In an embodiment where the RFQ and the quotes remain in the system, the buyer may use tools to compare and evaluate the quotes received.

Although the above embodiments have been described in connection with a server-based means of generating a response, it is to be understood that in other embodiments, the response may be generated by a remote workstation to which the merchant has access, such as a personal computer, personal digital assistant, Internet appliance, and the like. For example, it is possible for a buyer to directly send RFQs to one or more merchants. In such a situation, the merchant's workstation may be adapted to automatically respond, in similar manner as discussed above in connection with a server.

While the invention has been described with respect to the embodiments and variations set forth above, these embodiments and variations are examples and the invention is not to be considered limited in scope to these embodiments and variations. Accordingly, various other embodiments and modifications and improvements not described herein may be within the spirit and scope of the present invention, as defined by the following claims and their equivalents.

What is claimed is:

1. A method of utilizing an intermediary request for quote (RFQ) computer system in a system architecture of a client computer system, the RFQ computer system, and one or more merchant computer systems for automatically generating an electronic RFQ, the method comprising:
   performing by the RFQ computer system programmed with code stored in a memory and executing by a processor of the computer system to configure the computer system into a machine:
      receiving electronic product selection data representing one or more selected products and a quantity for each selected product to be included in the electronic RFQ, wherein each of the products are offered via one or more web pages generated by a second computer system;
      receiving an electronic request from a user of the client computer system, coupled to a network of interconnected systems, to generate said electronic RFQ, wherein the RFQ generation request includes product selection data indicating a selection of one or more products by the user and the RFQ generation request is received in response to selection by the user of an electronically selectable user interface component provided to the client computer system by the second computer system to allow the user to request generation of the electronic RFQ generation request;
      accessing at least one database at a central storage location to obtain a file associated with said user, said file comprising RFQ fulfillment related preferences of said user for generating said electronic RFQ, wherein one or more of said preferences are selected from the group comprising time until a due date of the RFQ, default service requirements from a merchant, time prior to sending the RFQ, and time until delivery after an order;
      populating fields of said electronic RFQ in accordance with said product selection data and preferences;
      selecting one or more merchants from a data storage device to receive the RFQ in accordance with the RFQ fulfillment related preferences; and
      sending said RFQ to each merchant computer system of each selected merchant via said network.

2. The method of claim 1, wherein said request comprises an electronic request.

3. The method of claim 1, wherein said preferences comprise default entries for said fields of said electronic RFQ.

4. The method of claim 1, further comprising:
   performing by the RFQ computer system programmed with code stored in the memory and executing by a processor of the computer system to further configure the computer system into the machine:
      sending a confirmation of said electronic RFQ to said user.

5. The method of claim 1 further comprising:
   performing by the RFQ computer system programmed with code stored in the memory and executing by a processor of the computer system to further configure the computer system into the machine:
      receiving a response to the electronic RFQ from at least one of the merchant computer systems, wherein the response to the electronic RFQ from at least one of the merchant computer systems comprises product quantity, price, and merchant information.

6. The method of claim 1 further comprising:
performing by the RFQ computer system programmed with code stored in the memory and executing by a processor of the computer system to further configure the computer system into the machine:
preparing a response to the electronic RFQ, wherein preparing the response further comprises:
assessing price information of a product corresponding to the selected one or more products including accessing at least one database of a supplier of the responding merchant, the database having price and availability information regarding the product from the supplier of the merchant, to ascertain a cost of the product from the supplier.

7. The method of claim 1 further comprising:
performing by the RFQ computer system programmed with code stored in the memory and executing by a processor of the computer system to further configure the computer system into the machine:
receiving a response to the RFQ from at least one of the merchant computer systems to whom the RFQ was directed.

8. The method of claim 1 wherein the code in the RFQ computer system further includes code to cause the RFQ computer system to receive one or more quotes in response to said electronic RFQ.

9. The method of claim 1, further comprising:
performing by the RFQ computer system programmed with code stored in the memory and executing by a processor of the RFQ computer system to further configure the RFQ computer system into the machine:
permitting said user to modify said file.

10. The method of claim 1, further comprising:
performing by the RFQ computer system programmed with code stored in the memory and executing by a processor of the RFQ computer system to further configure the RFQ computer system into the machine:
transmitting said file to the database for storage.

11. The method of claim 1, further comprising accessing said file upon receipt of electronic RFQ generation request.

12. The method of claim 11, further comprising:
performing by the RFQ computer system programmed with code stored in the memory and executing by a processor of the RFQ computer system to further configure the RFQ computer system into the machine:
creating said electronic RFQ using said information located within said file.

13. The method of claim 1, wherein the RFQ computer system is coupled to a network of interconnected computing systems.

14. A non-transitory, computer readable medium that comprises code stored therein and executable by one or more first data processors to configure a computer system into an intermediary request for quote (RFQ) computer system in a system architecture of a client computer system, the RFQ computer system, and one or more merchant computer systems to automatically generate an electronic RFQ, wherein the code when executed by the RFQ computer system configures the RFQ computer system into a machine for:
receiving electronic product selection data representing one or more selected products and a quantity for each selected product to be included in the electronic RFQ, wherein each of the products are offered via one or more web pages generated by a second computer system;
receiving an electronic request from a user of the client computer system, coupled to a network of interconnected systems, to generate said electronic RFQ, wherein the RFQ generation request includes product selection data indicating a selection of one or more products by the user and the RFQ generation request is received in response to selection by the user of an electronically selectable user interface component provided to the client computer system by the second computer system to allow the user to request generation of the electronic RFQ generation request;
accessing at least one database at a central storage location to obtain a file associated with said user, said file comprising RFQ fulfillment related preferences of said user for generating said electronic RFQ, wherein one or more of said preferences are selected from the group comprising time until a due date of the RFQ, default service requirements from a merchant, time prior to sending the RFQ, and time until delivery after an order;
populating fields of said electronic RFQ in accordance with said product selection data and preferences;
selecting one or more merchants from a data storage device to receive the RFQ in accordance with the RFQ fulfillment related preferences; and
sending said RFQ to each merchant computer system of each selected merchant via said network.

15. The non-transitory, computer readable medium of claim 14, wherein said request comprises an electronic request.

16. The non-transitory, computer readable medium of claim 14, wherein said preferences comprise default entries for said fields of said electronic RFQ.

17. The non-transitory, computer readable medium of claim 14 wherein the code stored therein and executable by the one or more first data processors further configures the RFQ computer system into a machine for:
sending a confirmation of said electronic RFQ to said user.

18. The non-transitory, computer readable medium of claim 14 wherein the code stored therein and executable by the one or more first data processors further configures the RFQ computer system into a machine for:
receiving a response to the electronic RFQ from at least one of the merchant computer systems, wherein the response to the electronic RFQ from at least one of the merchant computer systems comprises product quantity, price, and merchant information.

19. The non-transitory, computer readable medium of claim 14 wherein the code stored therein and executable by the one or more first data processors further configures the RFQ computer system into a machine for:
preparing a response to the electronic RFQ, wherein preparing the response further comprises:
assessing price information of a product corresponding to the selected one or more products including accessing at least one database of a supplier of the responding merchant, the database having price and availability information regarding the product from the supplier of the merchant, to ascertain a cost of the product from the supplier.

20. The non-transitory, computer readable medium of claim 14 wherein the code stored therein and executable by the one or more first data processors further configures the RFQ computer system into a machine for:

receiving a response to the RFQ from at least one of the merchant computer systems to whom the RFQ was directed.

21. The non-transitory, computer readable medium of claim 14 wherein the code in the RFQ computer system further includes code to cause the RFQ computer system to receive one or more quotes in response to said electronic RFQ.

22. The non-transitory, computer readable medium of claim 14 wherein the code stored therein and executable by the one or more first data processors further configures the RFQ computer system into a machine for:
permitting said user to modify said file.

23. The non-transitory, computer readable medium of claim 14 wherein the code stored therein and executable by the one or more first data processors further configures the RFQ computer system into a machine for:
transmitting said file to the database for storage.

24. The non-transitory, computer readable medium of claim 14 wherein the code stored therein and executable by the one or more first data processors further configures the RFQ computer system into a machine for:
accessing said file upon receipt of electronic RFQ generation request.

25. The non-transitory, computer readable medium of claim 24 wherein the code stored therein and executable by the one or more first data processors further configures the RFQ computer system into a machine for:
creating said electronic RFQ using said information located within said file.

26. An apparatus comprising:
one or more data processors;
a non-transitory, computer readable medium, coupled to the processor, that comprises code stored therein and executable by one or more first data processors to configure the apparatus into an intermediary request for quote (RFQ) computer system in a system architecture of a client computer system, the RFQ computer system, and one or more merchant computer systems to automatically generate an electronic RFQ, wherein the RFQ computer system is configured to:
receive electronic product selection data representing one or more selected products and a quantity for each selected product to be included in the electronic RFQ, wherein each of the products are offered via one or more web pages generated by a second computer system; receive an electronic request from a user of the client computer system, coupled to a network of interconnected systems, to generate said electronic RFQ, wherein the RFQ generation request includes product selection data indicating a selection of one or more products by the user and the RFQ generation request is received in response to selection by the user of an electronically selectable user interface component provided to the client computer system by the second computer system to allow the user to request generation of the electronic RFQ generation request;
access at least one database at a central storage location to obtain a file associated with said user, said file comprising RFQ fulfillment related preferences of said user for generating said electronic RFQ, wherein one or more of said preferences are selected from the group comprising time until a due date of the RFQ, default service requirements from a merchant, time prior to sending the RFQ, and time until delivery after an order;
populate fields of said electronic RFQ in accordance with said product selection data and preferences;
select one or more merchants from a data storage device to receive the RFQ in accordance with the RFQ fulfillment related preferences; and
send said RFQ to each merchant computer system of each selected merchant via said network.

27. The apparatus of claim 26, wherein said request comprises an electronic request.

28. The apparatus of claim 26, wherein said preferences comprise default entries for said fields of said electronic RFQ.

29. The apparatus of claim 26 wherein the code stored in the non-transitory, computer readable medium and executable by the one or more first data processors further configures the apparatus into a machine that is configured to:
send a confirmation of said electronic RFQ to said user.

30. The apparatus of claim 26 wherein the code stored in the non-transitory, computer readable medium and executable by the one or more first data processors further configures the apparatus into a machine that is configured to:
receive a response to the electronic RFQ from at least one of the merchant computer systems, wherein the response to the electronic RFQ from at least one of the merchant computer systems comprises product quantity, price, and merchant information.

31. The apparatus of claim 26 wherein the code stored in the non-transitory, computer readable medium and executable by the one or more first data processors further configures the apparatus into a machine that is configured to:
prepare a response to the electronic RFQ, wherein preparing the response further comprises:
assessing price information of a product corresponding to the selected one or more products including accessing at least one database of a supplier of the responding merchant, the database having price and availability information regarding the product from the supplier of the merchant, to ascertain a cost of the product from the supplier.

32. The apparatus of claim 26 wherein the code stored in the non-transitory, computer readable medium and executable by the one or more first data processors further configures the apparatus into a machine that is configured to:
receive a response to the RFQ from at least one of the merchant computer systems to whom the RFQ was directed.

33. The apparatus of claim 26 wherein the code stored in the non-transitory, computer readable medium and executable by the one or more first data processors further configures the apparatus into a machine that is configured to:
receive one or more quotes in response to said electronic RFQ.

34. The apparatus of claim 26 wherein the code stored in the non-transitory, computer readable medium and executable by the one or more first data processors further configures the apparatus into a machine that is configured to:
permit said user to modify said file.

35. The apparatus of claim 26 wherein the code stored in the non-transitory, computer readable medium and executable by the one or more first data processors further configures the apparatus into a machine that is configured to:
transmit said file to the database for storage.

36. The apparatus of claim 26 wherein the code stored in the non-transitory, computer readable medium and executable by the one or more first data processors further configures the apparatus into a machine that is configured to:

access said file upon receipt of electronic RFQ generation request.

37. The apparatus of claim 36 wherein the code stored in the non-transitory, computer readable medium and executable by the one or more first data processors further configures the apparatus into a machine that is configured to:
create said electronic RFQ using said information located within said file.

\* \* \* \* \*